US010683788B2

(12) United States Patent
Nakada et al.

(10) Patent No.: US 10,683,788 B2
(45) Date of Patent: Jun. 16, 2020

(54) NOX OCCLUSION AMOUNT ESTIMATING DEVICE AND NOX OCCLUSION AMOUNT ESTIMATING METHOD (71) Applicant: ISUZU MOTORS LIMITED, Tokyo (JP)

(72) Inventors: Teruo Nakada, Yokohama (JP); Takayuki Sakamoto, Fujisawa (JP); Daiji Nagaoka, Kamakura (JP)

(73) Assignee: ISUZU MOTORS LIMITED, Shinagawa-Ku, Tokyo (JP)

( * ) Notice: Subject to any disclaimer, the term of this patent is extended or adjusted under 35 U.S.C. 154(b) by 317 days.

(21) Appl. No.: 15/560,024

(22) PCT Filed: Mar. 15, 2016

(86) PCT No.: PCT/JP2016/058137
§ 371 (c)(1),
(2) Date: Sep. 20, 2017

(87) PCT Pub. No.: WO2016/152652
PCT Pub. Date: Sep. 29, 2016

(65) Prior Publication Data
US 2018/0073413 A1 Mar. 15, 2018

(30) Foreign Application Priority Data
Mar. 20, 2015 (JP) .................. 2015-057084

(51) Int. Cl.
*G01N 31/10* (2006.01)
*F01N 3/20* (2006.01)
(Continued)

(52) U.S. Cl.
CPC ............. *F01N 9/002* (2013.01); *B01D 53/94* (2013.01); *B01D 53/9422* (2013.01);
(Continued)

(58) Field of Classification Search
CPC . G01N 31/10; F01N 9/00; F01N 11/00; F01N 3/20; B01D 53/94
(Continued)

(56) References Cited

U.S. PATENT DOCUMENTS 5,894,725 A * 4/1999 Cullen .................. F01N 13/009
60/274
6,171,565 B1 * 1/2001 Hohne ............... B01D 53/9445
423/239.1
(Continued)

FOREIGN PATENT DOCUMENTS

CN 102486110 A 6/2012
EP 1083306 A1 3/2001
(Continued)

OTHER PUBLICATIONS

Extended European Search Report for related EP Application No. 16768555.1, dated Nov. 23, 2018; 8 pages.
(Continued)

*Primary Examiner* — Arlen Soderquist
(74) *Attorney, Agent, or Firm* — Procopio, Cory, Hargreaves & Savitch LLP (57) ABSTRACT

An exhaust purification system includes a NOx-occlusion-reduction-type catalyst that occludes NOx in exhaust in a lean state and reduces and purifies the occluded NOx in exhaust in a rich state, and a NOx purge rich control unit that executes NOx purge of reducing and purifying the occluded NOx by putting the exhaust into the rich state by fuel injection control, where a catalyst temperature of the NOx-occlusion-reduction-type catalyst is equal to or higher than a catalyst temperature threshold value and a NOx occlusion amount of the NOx-occlusion-reduction-type catalyst is equal to or higher than an NOx occlusion amount threshold (Continued)

value, and executes the NOx purge when the catalyst temperature is lower than a catalyst temperature threshold value.

5 Claims, 8 Drawing Sheets (51) Int. Cl.
F01N 9/00 (2006.01)
F01N 11/00 (2006.01)
B01D 53/94 (2006.01)
F01N 3/08 (2006.01)
F02D 41/14 (2006.01)
F02D 41/00 (2006.01)
F02D 41/18 (2006.01)
F02D 41/02 (2006.01)
F02D 41/40 (2006.01)
F02D 41/24 (2006.01)

(52) U.S. Cl.
CPC ....... B01D 53/9495 (2013.01); F01N 3/0814 (2013.01); F01N 3/0842 (2013.01); F01N 3/0871 (2013.01); F01N 3/20 (2013.01); F01N 9/00 (2013.01); F01N 9/005 (2013.01); F01N 11/00 (2013.01); F01N 11/002 (2013.01); F01N 11/007 (2013.01); F02D 41/0002 (2013.01); F02D 41/0052 (2013.01); F02D 41/0275 (2013.01); F02D 41/146 (2013.01); F02D 41/1456 (2013.01); F02D 41/1475 (2013.01); F02D 41/18 (2013.01); F01N 2250/12 (2013.01); F01N 2430/06 (2013.01); F01N 2560/025 (2013.01); F01N 2560/026 (2013.01); F01N 2560/06 (2013.01); F01N 2560/14 (2013.01); F01N 2570/14 (2013.01); F01N 2900/0412 (2013.01); F01N 2900/0422 (2013.01); F01N 2900/0601 (2013.01); F01N 2900/08 (2013.01); F01N 2900/16 (2013.01); F01N 2900/1602 (2013.01); F01N 2900/1614 (2013.01); F01N 2900/1621 (2013.01); F02D 41/2448 (2013.01); F02D 41/2454 (2013.01); F02D 41/405 (2013.01); F02D 2041/1433 (2013.01); F02D 2200/0802 (2013.01); F02D 2200/0804 (2013.01); F02D 2200/0806 (2013.01); F02D 2200/0808 (2013.01); Y02T 10/47 (2013.01)

(58) Field of Classification Search
USPC ........................................................ 436/116
See application file for complete search history.

(56) References Cited

U.S. PATENT DOCUMENTS

| | | | | |
|---|---|---|---|---|
| 6,422,004 B1* | 7/2002 | Takami | ................ | F01N 3/0842 60/285 |
| 6,508,057 B1* | 1/2003 | Bouchez | ............ | B01D 53/9431 60/286 |
| 6,911,184 B1* | 6/2005 | Matsunaga | ........ | B01D 53/9431 422/108 |
| 7,997,067 B2* | 8/2011 | Morita | ................ | F01N 3/0814 60/274 |
| 10,233,807 B2* | 3/2019 | Nakada | ................ | B01D 53/94 |
| 2001/0025486 A1* | 10/2001 | Ogiso | ........................ | F01L 9/04 60/285 |
| 2001/0032457 A1 | 10/2001 | Ludwig et al. | | |
| 2002/0124551 A1* | 9/2002 | Birkhofer | .......... | B01D 53/9409 60/277 |
| 2003/0115858 A1* | 6/2003 | Hahn | ................ | B01D 53/0454 60/295 |
| 2003/0126857 A1* | 7/2003 | Kitahara | ............ | B01D 53/9495 60/278 |
| 2003/0136113 A1* | 7/2003 | Nakagawa | ............ | F01N 3/0814 60/285 |
| 2004/0103650 A1* | 6/2004 | Miyashita | ............. | F01N 3/0842 60/285 |
| 2004/0261397 A1* | 12/2004 | Yang | ..................... | F01N 3/0814 60/274 |
| 2006/0032213 A1* | 2/2006 | Woll | ..................... | F01N 3/0871 60/274 |
| 2006/0053778 A1* | 3/2006 | Asanuma | ............... | F01N 3/0814 60/295 |
| 2006/0064968 A1* | 3/2006 | Sunohara | ............... | F01N 3/0842 60/285 |
| 2006/0096277 A1* | 5/2006 | Surnilla | ............. | B01D 53/9409 60/286 |
| 2007/0199303 A1* | 8/2007 | Votsmeier | .......... | B01D 53/9495 60/285 |
| 2008/0120969 A1* | 5/2008 | Morita | ................ | F01N 3/0814 60/295 |
| 2009/0229249 A1* | 9/2009 | Bremm | ................ | F01N 3/0814 60/276 |
| 2010/0115923 A1* | 5/2010 | Tsujimoto | .......... | B01D 53/9431 60/285 |
| 2010/0242480 A1* | 9/2010 | Ohashi | ............... | B01D 53/9409 60/689 |
| 2011/0308235 A1* | 12/2011 | Bisaiji | ................. | F02D 41/0275 60/301 |
| 2012/0137661 A1 | 6/2012 | Lee et al. | | |
| 2012/0137662 A1* | 6/2012 | Lee | ........ | F01N 3/0814 60/286 |
| 2012/0137663 A1* | 6/2012 | Lee | .......... | F01N 3/025 60/287 |
| 2015/0322834 A1* | 11/2015 | Haba | ..................... | F01N 3/0814 60/285 |
| 2018/0066556 A1* | 3/2018 | Nakada | .................. | B01D 53/94 |

FOREIGN PATENT DOCUMENTS

| | | | |
|---|---|---|---|
| EP | 1167712 A1 | 1/2002 | |
| EP | 2460994 A2 | 6/2012 | |
| EP | 2461000 A2 | 6/2012 | |
| JP | 2004-100476 A | 4/2004 | |
| JP | 2007-016713 A | 1/2007 | |
| JP | 2007-162550 A | 6/2007 | |
| JP | 4131151 B2 | 6/2008 | |
| JP | 2008-202425 A | 9/2008 | |
| JP | 2011-231755 A | 11/2011 | |
| JP | 2013-100725 A | 5/2013 | |
| JP | 2016-176403 | * 10/2016 | |

OTHER PUBLICATIONS

Office Action for related CN Patent Application No. 201680016635.8, dated Mar. 13, 2019, in 17 pages.
International Search Report and Written Opinion for PCT App No. PCT/JP2016/058137 dated Jun. 21, 2016, 8 pgs.

* cited by examiner

NOX OCCLUSION AMOUNT ESTIMATING DEVICE AND NOX OCCLUSION AMOUNT ESTIMATING METHOD

CROSS-REFERENCE TO RELATED APPLICATIONS

This application is a U.S. National Stage entry of PCT Application No. PCT/JP2016/058137, filed on Mar. 15, 2016, which claims priority to Japanese Patent Application No. 2015-057084, filed Mar. 20, 2015, the contents of which are incorporated herein by reference.

TECHNICAL FIELD

The present invention relates to a NOx occlusion amount estimating device and a NOx occlusion amount estimating method, and more particularly, to estimation of a NOx occlusion amount of NOx-occlusion-reduction-type catalyst.

BACKGROUND ART

In the related art, NOx-occlusion-reduction-type catalyst has been known, as catalyst for reducing and purifying NOx in exhaust to be emitted from an internal combustion engine. When the exhaust is in a lean atmosphere, the NOx-occlusion-reduction-type catalyst occludes NOx contained in the exhaust, and when the exhaust is in a rich atmosphere, the NOx-occlusion-reduction-type catalyst detoxifies and releases the occluded NOx with hydrocarbon contained in the exhaust by reduction and purification. For this reason when a NOx occlusion amount of the catalyst reaches a predetermined amount, it is necessary to periodically perform NOx purge of enriching the exhaust by exhaust pipe injection or post injection so as to recover a NOx occlusion capacity (for example, refer to PTLs 1 and 2).

CITATION LIST

Patent Literature

PTL 1: Japanese Patent Application Publication No. 2008-202425A
PTL 2: Japanese Patent Application Publication No. 2007-16713A

SUMMARY OF INVENTION

Technical Problem

In order to improve controllability of the NOx purge, it is necessary to estimate the NOx occlusion amount of the NOx-occlusion-reduction-type catalyst with high precision. As a method of estimating the NOx occlusion amount, it is considered to calculate a total NOx occlusion amount, which can be occluded in the catalyst, on the basis of a catalyst-inlet NOx amount emitted from the engine and introduced into the catalyst, a catalyst temperature and the like, and to subtract a NOx reduction amount, which is to be reduced by the NOx purge, from the total NOx occlusion amount.

However, a part or all of occluded NOx may be separated and released from the catalyst due to an increase in exhaust temperature during a lean operation except for the NOx purge, for example during filter forced regeneration. If the NOx occlusion amount is estimated without considering the NOx release amount, the NOx purge is implemented on the basis of an estimated value greater than an actual NOx occlusion amount, so that the fuel consumption is deteriorated due to useless fuel consumption.

A NOx occlusion amount estimating device and at NOx occlusion amount estimating method of the disclosure are to effectively improve estimation accuracy of a NOx occlusion amount by considering a lean-time NOx release amount when estimating a NOx occlusion amount.

Solution to Problem

A NOx occlusion amount estimating device of the disclosure is a NOx occlusion amount estimating device of a NOx-occlusion-reduction-type catalyst provided in an exhaust passage of an engine and configured to purify NOx in exhaust, and includes catalyst temperature acquisition means for acquiring a catalyst temperature of the NOx-occlusion-reduction-type catalyst, provisional NOx occlusion amount calculation means for calculating, as a provisional NOx occlusion amount, a NOx amount, which is to be emitted from the engine and occluded in the NOx-occlusion-reduction-type catalyst, on the basis of a catalyst-inlet NOx amount estimated from an operating state of the engine and the catalyst temperature acquired by the catalyst temperature acquisition means, NOx release amount calculation means for calculating a lean-time NOx release amount, which is to be separated and released from the NOx-occlusion-reduction-type catalyst during a lean operation of the engine, on the basis of the catalyst temperature acquired by the catalyst temperature acquisition means during the lean operation, and actual NOx Occlusion amount calculation means for calculating an actual NOx occlusion amount occluded in the NOx-occlusion-reduction-type catalyst by subtracting the lean-time NOx release amount from the provisional NOx occlusion amount.

Also, a NOx occlusion amount estimating method of the disclosure is a NOx occlusion amount estimating method of a NOx-occlusion-reduction-type catalyst provided an exhaust passage of an engine and configured to purify NOx in exhaust, and includes:

catalyst temperature acquisition processing of acquiring a catalyst temperature of the NOx-occlusion-reduction-type catalyst, provisional NOx occlusion amount calculation processing of calculating, as a provisional NOx occlusion amount, a NOx amount, which is to be emitted from the engine and occluded in the NOx-occlusion-reduction-type catalyst, on the basis of a catalyst-inlet NOx amount estimated from an operating state of the engine and a catalyst temperature acquired by the catalyst temperature acquisition processing, NOx release amount calculation processing of calculating a lean-time NOx release amount, which is to be separated and released from the NOx-occlusion-reduction-type catalyst during a lean operation of the engine, on the basis of the catalyst temperature acquired by the catalyst temperature acquisition processing during the lean operation, and actual NOx occlusion amount calculation processing of calculating an actual NOx occlusion amount occluded in the NOx-occlusion-reduction-type catalyst by subtracting the lean-time NOx release amount from the provisional NOx occlusion amount.

Advantageous Effects of Invention

According to the NOx occlusion amount estimating device and the NOx occlusion amount estimating method of the disclosure, it is possible to effectively improve estimation accuracy of the NOx occlusion amount by considering the lean-time NOx release amount when estimating the NOx occlusion amount.

DESCRIPTION OF EMBODIMENTS

Hereinafter, a NOx occlusion amount estimating device in accordance with an illustrative embodiment of the disclosure and an exhaust purification system to which the device is applied will be described with reference to the accompanying drawings.

Figure 1:
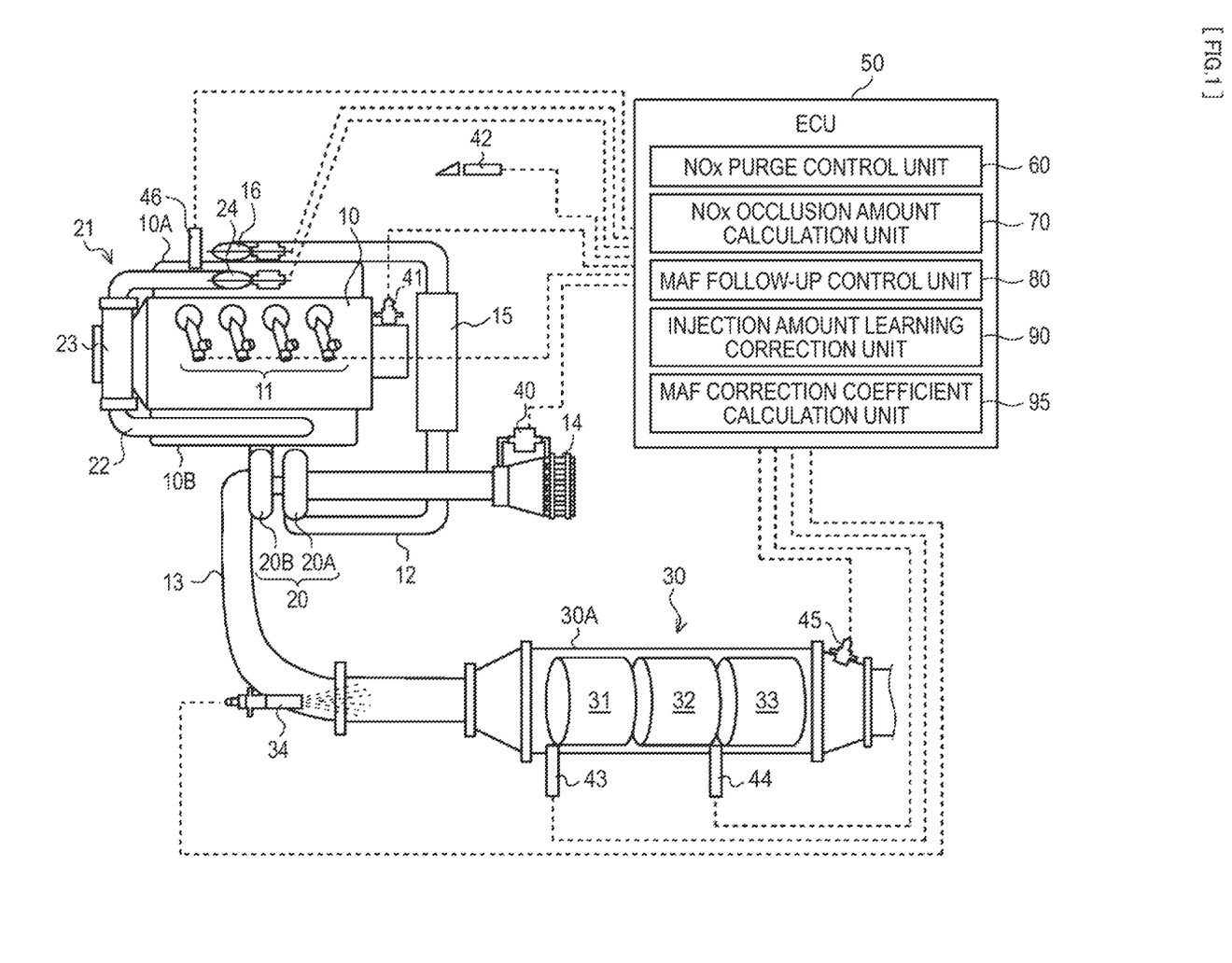
FIG. 1 is an overall configuration view depicting an exhaust purification system in accordance with an illustrative embodiment.

As shown in FIG. 1, each cylinder of a Diesel engine (hereinafter, simply referred to as 'engine') 10 is provided with an in-cylinder injector 11 configured to directly inject high-pressure fuel accumulated to a common rail (not shown) into each cylinder. A fuel injection amount and fuel injection timing of each in-cylinder injector 11 are controlled in accordance with instruction signals that are input from an electronic control unit (hereinafter, referred to as 'ECU') 50.

An intake manifold 10A of the engine 10 is connected with an intake passage 12 for introducing therein fresh air, and an exhaust manifold 10B is connected with an exhaust passage 13 for discharging exhaust to an outside. The intake passage 12 is provided with an air cleaner 14, an intake air amount sensor (hereinafter, referred to as 'MAF sensor') 40, a compressor 20A of a variable capacity-type supercharger 20, an intercooler 15, an intake throttle valve 16 and the like in corresponding order from an intake upstream side. The exhaust passage 13 is provided with a turbine 20B of the variable capacity-type supercharger 20, an exhaust after-treatment device 30 and the like in corresponding order from an exhaust upstream side. In the meantime, the engine 10 is mounted with an engine revolution sensor 41, an accelerator opening degree sensor 42 and a boost pressure sensor 46.

An EGR (Exhaust Gas Recirculation) device 21 includes an EGR passage 22 configured to connect the exhaust manifold 10B and the intake manifold 10A each other, an EGR cooler 23 configured to cool an EGR gas, and an EGR valve 24 configured to regulate an EGR amount.

The exhaust after-treatment device 30 includes an oxidation catalyst 31, a NOx-occlusion-reduction-type catalyst 32 and a particulate filter (hereinafter, simply referred to as 'filter') 33, which are arranged in a case 30A in corresponding order from the exhaust upstream side. Also, the exhaust passage 13 positioned further upstream than the oxidation catalyst 31 is provided with an exhaust injector 34 configured to inject unburnt fuel (mainly, hydrocarbon (HC)) into the exhaust passage 13, in response to an instruction signal input from the ECU 50.

The oxidation catalyst 31 is formed by carrying are oxidation catalyst component on a surface of a ceramic carrier such as a honeycomb structure, for example. When the unburnt fuel is supplied by exhaust pipe injection of the exhaust injector 34 or post injection of the in-cylinder injector 11, the oxidation catalyst 31 oxidizes the same to increase an exhaust temperature.

The NOx-occlusion-reduction-type catalyst 32 is formed by carrying alkali metal or the like on a surface of a ceramic carrier such as a honeycomb structure, for example. The NOx-occlusion-reduction-type catalyst 32 occludes NOx in the exhaust when an exhaust air-fuel ratio is in a lean state, and reduces and purifies the occluded NOx with a reducing agent (HC or the like) included in the exhaust when the exhaust air-fuel ratio is in a rich state.

The filter 33 is formed by arranging a plurality of cells, which are divided by a porous partition wall, along a flowing direction of the exhaust and alternately plugging upstream and downstream sides of the cells, for example. The filter 33 is configured to trap particulate matters (PM) in the exhaust in fine holes or surfaces of the partition wall, and when an estimated deposition amount of the PM reaches a predetermined amount, so-called filter forced regeneration of combusting and removing the deposited PM is executed. The filter forced regeneration is performed by supplying the unburnt fuel to the upstream oxidation catalyst 31 by the exhaust pipe injection or the post injection and increasing a temperature of the exhaust to be introduced to the filter 33 to a PM combustion temperature.

A first exhaust temperature sensor 43 is provided further upstream than the oxidation catalyst 31 and is configured to detect a temperature of the exhaust to be introduced into the oxidation catalyst 31. A second exhaust temperature sensor 44 is provided between the NOx-occlusion-reduction-type catalyst 32 and the filter 33, and is configured to detect a temperature of the exhaust to be introduced into the filter 33. A NOx/lambda sensor 45 is provided further downstream than the filter 33, and is configured to detect a NOx value and a lambda value (hereinafter, referred to as 'air excess ratio') of the exhaust having passed through the NOx-occlusion-reduction-type catalyst 32.

The ECU 50 is configured to perform a variety of controls of the engine 10 and the like and includes a CPU, a ROM, a RAM, an input port, an output port and the like, which are well known. In order to perform the diverse controls, the ECU 50 is input with sensor values of the sensors 40 to 45. Also, the ECU 50 has, as some functional elements, a NOx purge control unit 60, a NOx occlusion amount calculation unit 70, an MAF follow-up control unit 80, an injection amount learning correction unit 90 and an MAF correction coefficient calculation unit 95. The functional elements are included in the ECU 50, which is the integral hardware. However, some of the functional elements may be provided in separate hardware.

[NOx Purge Control]

The NOx purge control unit 60 is the catalyst regeneration means of the disclosure, and is configured to execute catalyst regeneration processing of enriching the exhaust to detoxify and release NOx, which is occluded in the NOx-occlusion-reduction-type catalyst 32, by reduction and purification, thereby recovering a NOx occlusion capacity of the NOx-occlusion-reduction-type catalyst 32 (hereinafter, the control is referred to as 'perform NOx purge control').

When a NOx occlusion amount estimated value $str_{est}$ of the NOx-occlusion-reduction-type catalyst 32, which is to be estimated by the NOx occlusion amount calculation unit 70 (which will be described in detail later), exceeds a predetermined threshold value or when a NOx conversion efficiency by the NOx-occlusion-reduction-type catalyst 32 is calculated from a NOx release amount of a catalyst upstream-side estimated from an operating state of the engine 10 and a NOx amount of a catalyst downstream-side detected by the NOx/lambda sensor 45 and the NOx conversion efficiency becomes lower than a predetermined determination threshold value, a NOx purge flag $F_{NP}$ becomes on and the NOx purge control is started (refer to time $t_1$ in FIG. 2).

In the illustrative embodiment, the enriching of the exhaust by the NOx purge control is implemented by concurrently using NOx purge lean control of lowering an air excess ratio from a value for example, about 1.5) upon normal operation to a first target air excess ratio (for example, about 1.3) closer to a lean side than a theoretical air-fuel ratio equivalent value (for example, about 1.0) by air system control and NOx purge rich control of lowering the air excess ratio from the first target air excess ratio to a second target air excess ratio (for example, about 0.9) of a rich side by injection system control. Hereinafter, the NOx purge lean control and the NOx purge rich control are described in detail.

[NOx Purge Lean Control]

Figure 3:
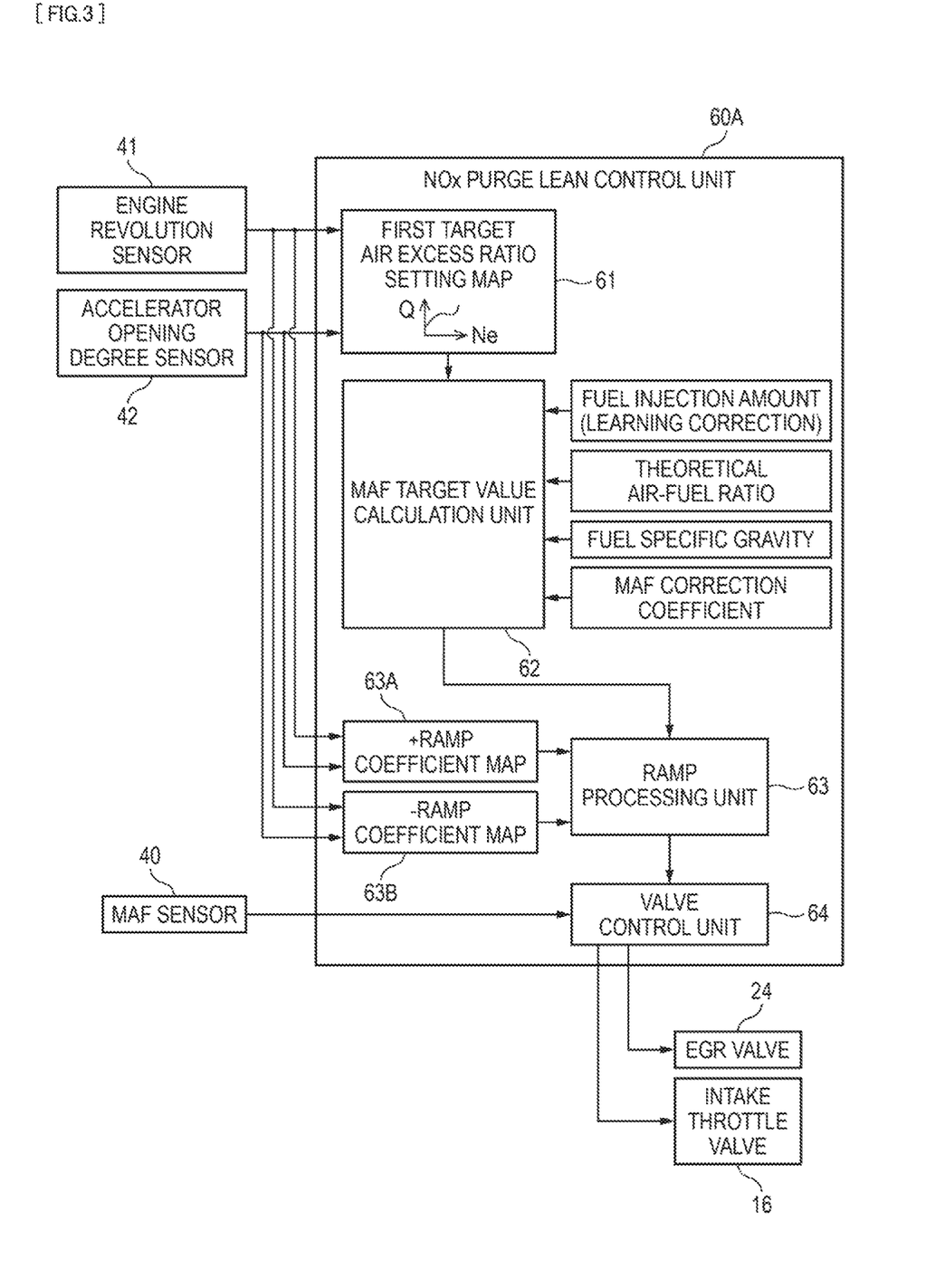
FIG. 3 is a block diagram depicting setting processing of an MAF target value that is to be used for NOx purge lean control in accordance with the illustrative embodiment.

FIG. 3 is a block diagram depicting setting processing of an MAF target value $MAF_{NPL\_Trgt}$ that is to be performed by a NOx purge lean control unit 60A. A first target air excess ratio setting map 61 is a map that is to be referred to on the basis of an engine revolution Ne and an accelerator opening degree Q, and an air excess ratio target value $\lambda_{NPL\_Trgt}$ (first target air excess ratio) upon NOx purge lean control corresponding to the engine revolution Ne and the accelerator opening degree Q is set in advance by a test and the like.

First, the air excess ratio target value $\lambda_{NPL\_Trgt}$ upon NOx purge lean control is read from the first target air excess ratio setting map 61, in response to the engine revolution Ne and the accelerator opening degree Q, which are input signals, and is then input to an MAF target value calculation unit 62. Also, the MAF target value calculation unit 62 calculates an MAF target value $MAF_{NPL\_Trgt}$ upon NOx purge lean control, based on an equation (1).

$$MAF_{NPL\_Trgt} = \lambda_{NPL\_Trgt} \times Q_{fnl\_corrd} \times Ro_{Fuel} \times AFR_{std} / Maf_{corr} \quad (1)$$

In the equation (1). $Q_{fnl\_corrd}$ indicates a fuel injection amount (the post injection is excluded) of the in-cylinder injector 11 that has been learning-corrected (which will be described later), $Ro_{Fuel}$ indicates a fuel specific gravity, $AFR_{sto}$ indicates a theoretical air-fuel ratio, and $Maf_{corr}$ indicates an MAF correction coefficient (which will be described later).

Figure 2:
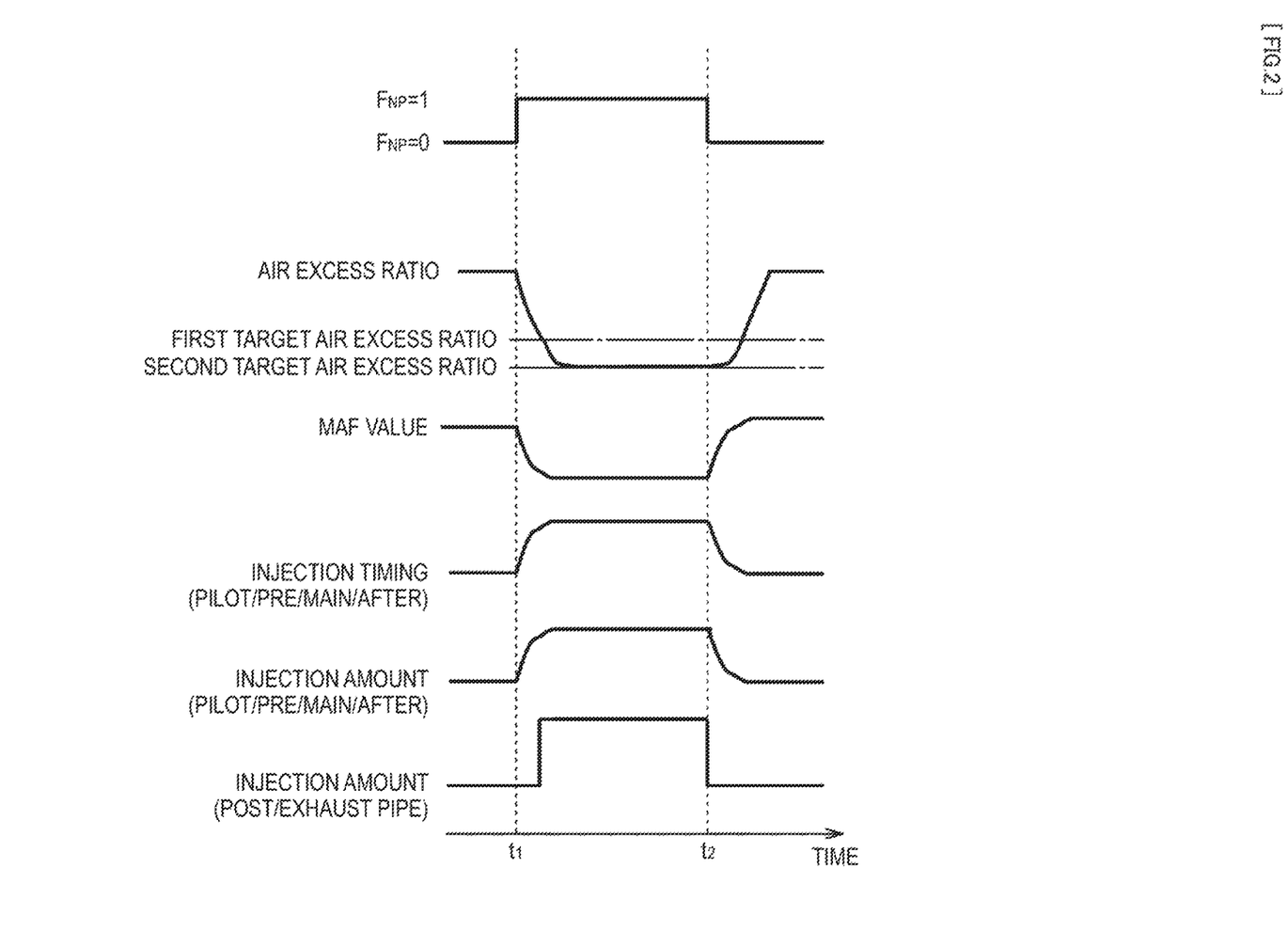
FIG. 2 is a timing chart diagram for illustrating NOx purge control in accordance with the illustrative embodiment.

The MAF target value $MAF_{NPL\_Trgt}$ calculated by the MAF target value calculation unit 62 is input to a ramp processing unit 63 when the NOx purge flag $F_{NP}$ becomes on (refer to time $t_1$ in FIG. 2). The ramp processing unit 63 reads a ramp coefficient from each of ramp coefficient maps 63A, 63B, in response to the engine revolution Ne and the accelerator opening degree Q, which are input signals, and inputs an MAF target ramp value $MAF_{NPL\_Trgt\_Ramp}$ to which the ramp coefficient is added to a valve control unit 64.

The valve control unit 64 executes feedback control of narrowing the intake throttle valve 16 towards a close side and widening the EGR valve 24 towards an open side so that an actual MAF value $MAF_{Act}$ input from the MAP sensor 40 becomes an MAF target ramp value $MAF_{NPL\_Trgt\_Ramp}$.

In this way, in the illustrative embodiment, the NOx purge lean control unit 60A is configured to set the MAF target value $MAF_{NPL\_Trgt}$ on the basis of the air excess ratio target value $\lambda_{NPL\_Trgt}$, which is to be read from the first target air excess ratio setting map 61, and the fuel injection amount of each in-cylinder injector 11, and to control the air system operation in the feedback manner on the basis of the MAF target value $MAF_{NPL\_Trgt}$. Thereby, it is possible to effectively lower the exhaust to a desired air excess ratio necessary for the NOx purge lean control without providing a lambda sensor at the upstream side of the NOx-occlusion-reduction-type catalyst 32 or without using a sensor value of a lambda sensor even when the lambda sensor is provided at the upstream side of ale NOx-occlusion-reduction-type catalyst 32.

Also, the fuel injection amount $Q_{fnl\_coord}$ after the learning correction is used as the fuel injection amount of each in-cylinder injector 11, so that it is possible to set the MAF target value $MAF_{NPL\_Trgt}$ in the feed-forward control manner. Therefore, it is possible to effectively exclude influences such as aging degradation and characteristic change of each in-cylinder injector 11.

Also, the ramp coefficient, which is to be set in correspondence to the operating state of the engine 10, is added to the MAF target value $MAF_{NPL\_Trgt}$, so that it is possible to effectively prevent accident fire of the engine 10 due to a rapid change in the intake air amount, deterioration of drivability due to torque variation, and the like.

[Setting of Fuel Injection Amount in NOx Purge Rich Control]

Figure 4:
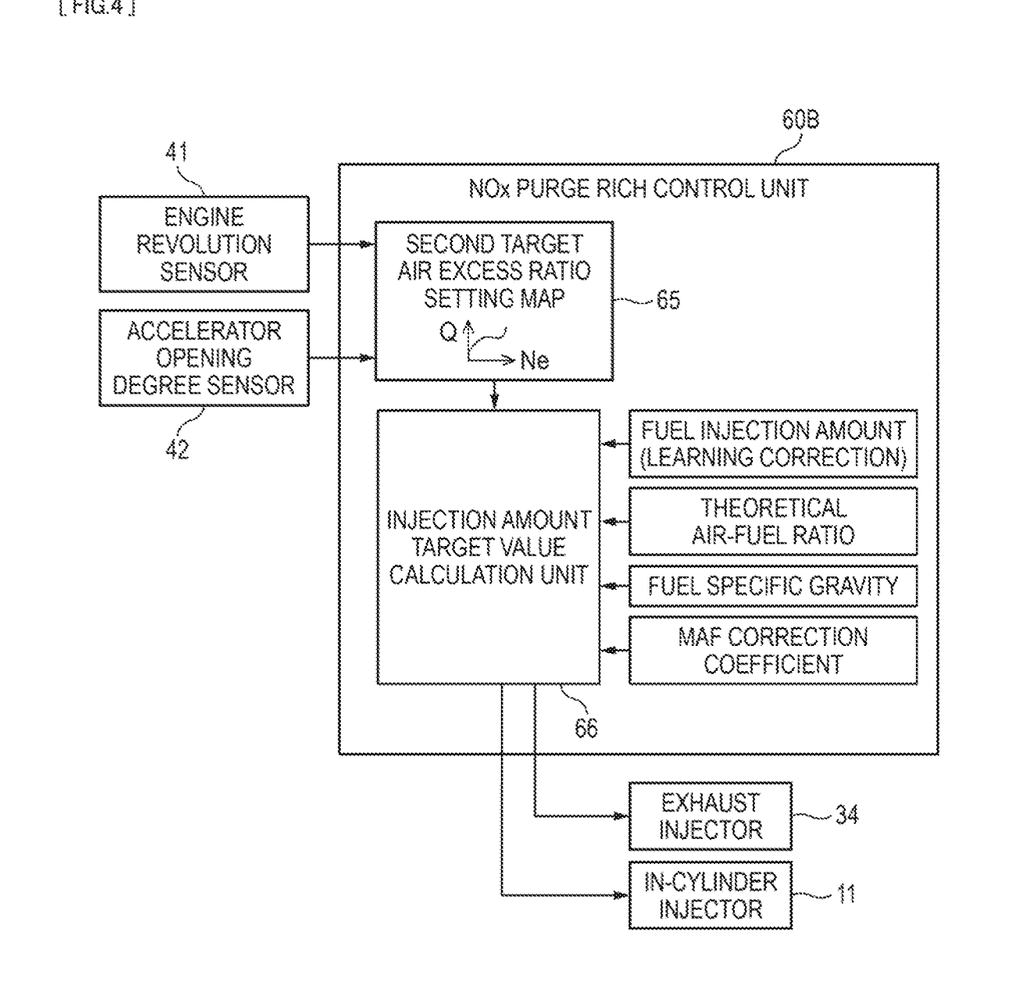
FIG. 4 is a block diagram depicting setting processing of a target injection amount that is to be used for NOx purge rich control in accordance with the illustrative embodiment.

FIG. 4 is a block diagram depicting setting processing of a target injection amount $Q_{NPR\_Trgt}$ (injection amount per unit time) of the exhaust pipe injection or the post injection, which is to be performed by a NOx purge rich control unit 60B. A second target air excess ratio setting map 65 is a map that is to be referred to on the basis of the engine revolution Ne and the accelerator opening degree Q, and an air excess ratio target value $\lambda_{NPR\_Trgt}$ (second target air excess ratio) upon NOx purge rich control corresponding to the engine revolution Ne and the accelerator opening degree Q is set in advance by a test and the like.

First, the air excess ratio target value $\lambda_{NPR\_Trgt}$ upon NOx purge rich control is read from the second target air excess ratio setting map 65, in response to the engine revolution Ne and the accelerator opening degree Q, which are input signals, and is then input to an injection amount target value calculation unit 66. Also, the injection amount target value calculation unit 66 calculates a target injection amount $Q_{NPR\_Trgt}$ upon NOx purge rich control, based on an equation (2).

$$Q_{NPR\_Trgt} = MAF_{NPL\_Trgt} \times Maf_{corr} / (\lambda_{NPR\_Trgt} \times Ro_{Fuel} \times AFR_{sto}) - Q_{fnl\_coord} \quad (2)$$

In the equation (2), $MAF_{NPL\_Trgt}$ is input from the MAF target value calculation unit 62, as a NOx purge lean MAF target value. Also, $Q_{fnl\_coord}$ indicates a fuel injection amount (the post injection is excluded) of the learning-corrected in-cylinder injector 11 before an MAF follow-up control is applied. $Ro_{Fuel}$ indicates a fuel specific gravity, $AFR_{sto}$ indicates a theoretical air-fuel ratio, and $Maf_{corr}$ indicates an MAF correction coefficient (which will be described later).

The target injection amount $Q_{NPR\_Trgt}$ calculated by the injection amount target value calculation unit 66 is transmitted to the exhaust injector 34 or each in-cylinder injector 11, as an injection instruction signal, when the NOx purge flag $F_{NP}$ becomes on (refer to time $t_1$ in FIG. 2). The transmission of the injection continuously performed until the NOx purge flag $F_{NP}$ becomes off (refer to time $t_2$ in FIG. 2) by ending determination of the NOx purge control, which will be described later.

In this way, in the illustrative embodiment, the NOx purge rich control unit 60B is configured to set the target injection amount $Q_{NPR\_Trgt}$ on the basis of the air excess ratio target value $\lambda_{NPR\_Trgt}$, which is to be read from the second target air excess ratio setting map 65, and the fuel injection amount of each in-cylinder injector 11. Thereby, it is possible to effectively lower the exhaust to the desired air excess ratio necessary for the NOx puree rich control without providing a lambda sensor at the upstream side of the NOx-occlusion-reduction-type catalyst 32 or without using a sensor value of a lambda sensor even when the lambda sensor is provided at the upstream side of the NOx-occlusion-reduction-type catalyst 32.

Also, the fuel injection amount $Q_{fnl\_corrd}$ after the learning correction is used as the fuel injection amount of each in-cylinder injector 11, so that it is possible to set the target injection amount $Q_{NPR\_Trgt}$ in the feed-forward control manner. Therefore, it is possible to effectively exclude influences such as aging degradation and characteristic change of each in-cylinder injector 11.

[Ending Determination of NOx Purge Control]

When an one of conditions that (1) the injection amounts of the exhaust pipe injection or the post injection are cumulated from the on-state of the NOx purge flag $F_{NP}$ and the cumulated injection amount reaches a predetermined upper limit threshold value amount, (2) elapse time measured from the start of the NOx purge control reaches predetermined upper limit threshold value time and (3) a NOx occlusion amount estimated value $str_{est}$ that is to be estimated by the NOx occlusion amount calculation unit 70 is lowered to a predetermined threshold value indicative of NOx removal success is satisfied, the NOx purge flag $F_{NP}$ is set to an off-state and the NOx purge control is over (refer to time $t_2$ in FIG. 2).

[NOx Occlusion Amount Estimation]

Figure 5:
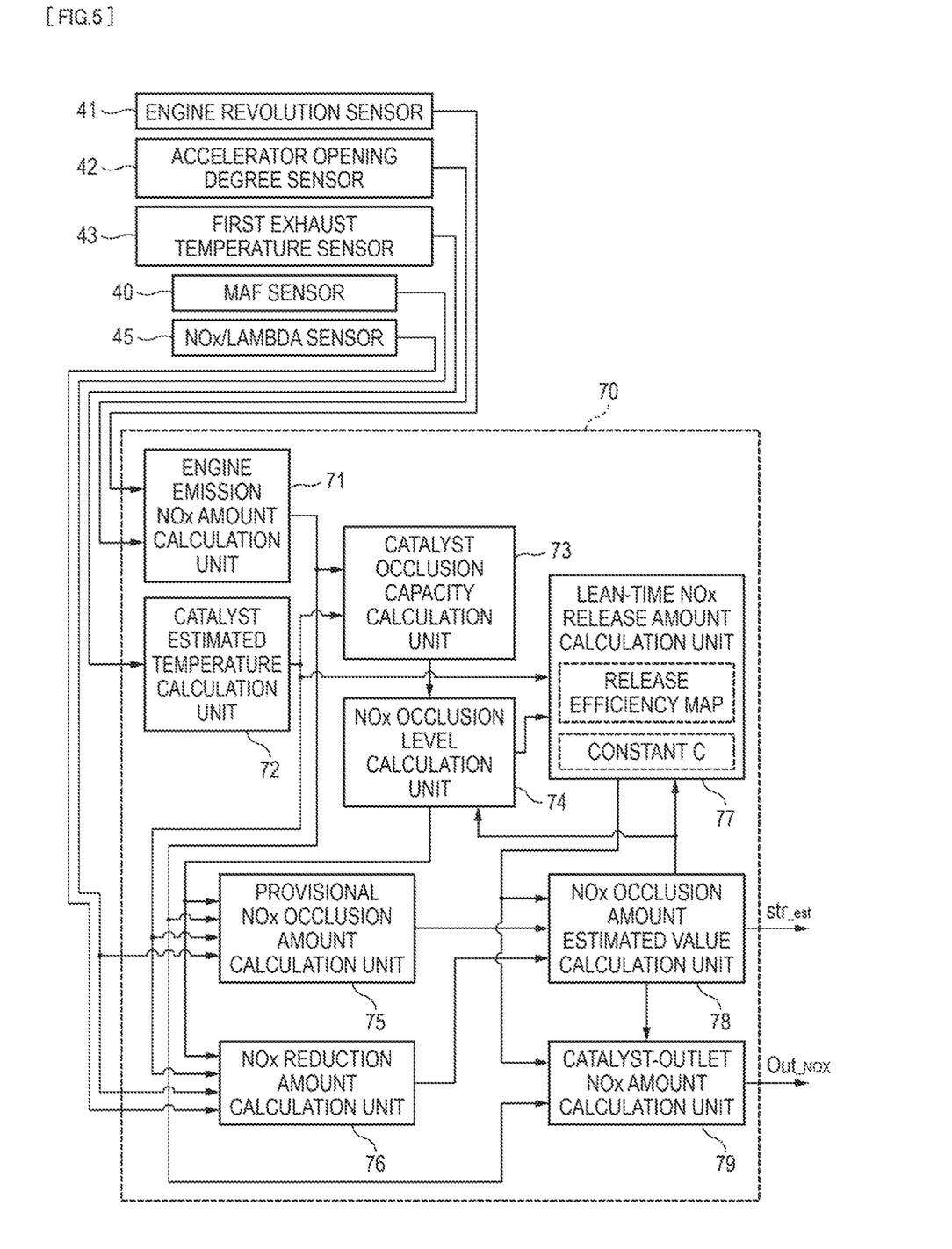
FIG. 5 is a block diagram depicting estimation processing of a NOx occlusion amount in accordance with the illustrative embodiment.

FIG. 5 is a block diagram depicting estimation processing of a NOx occlusion amount estimated value $str_{est}$ that is to be performed by the NOx occlusion amount calculation unit 70.

An engine emission NOx amount calculation unit 71 is configured to calculate a NOx amount (hereinafter, referred to as 'catalyst-inlet NOx amount $In_{NOx}$') that is to be emitted from the engine 10 and introduced into the NOx-occlusion-reduction-type catalyst 32. The catalyst-inlet NOx amount $In_{NOx}$ may be calculated from a map, which is referred to on the basis of the engine revolution Ne and the accelerator opening degree Q, a model equation or the like, for example.

A catalyst estimated temperature calculation unit 72 is configured to calculate a catalyst estimated temperature $Temp_{LNT}$ of the NOx-occlusion-reduction-type catalyst 32. The catalyst estimated temperature $Temp_{LNT}$ may be calculated on the basis of an inlet temperature of the oxidation catalyst 31, which is detected by the first exhaust temperature sensor 43, amounts of heat generation of HC/CO in the oxidation catalyst 31 and the NOx-occlusion-reduction-type catalyst 32, an amount of heat generation to an exterior air, and the like, for example.

A catalyst occlusion capacity calculation, unit 73 is configured to calculate a NOx occlusion capacity $str_{vol}$ of the NOx-occlusion-reduction-type catalyst 32, which changes in correspondence to the catalyst-inlet NOx amount $In_{NOx}$ and the catalyst estimated temperature $Temp_{LNT}$. The NOx occlusion capacity $str_{vol}$ may be calculated on the basis of a model equation including, as input values, the catalyst-inlet NOx amount $In_{NOx}$ and the catalyst estimated temperature $Temp_{LNT}$, a map or the like, for example.

A NOx occlusion level calculation unit 74 is configured to calculate a current NOx occlusion level $str_{lvl}$ relative to the NOx occlusion capacity $str_{vol}$. The NOx occlusion level $str_{lvl}$ is obtained by dividing a value, which is obtained by subtracting a NOx occlusion amount estimated value $str_{est}$ calculated by a NOx occlusion amount estimated value calculation unit 78 (which will be described later) from the NOx occlusion capacity $str_{vol}$, by the NOx occlusion capacity $str_{vol}$ ($str_{lvl}=(str_{vol}-str_{est})/str_{vol}$).

A provisional NOx occlusion amount calculation unit 75 is configured to calculate a total NOx amount (hereinafter, referred to as 'provisional NOx occlusion amount $abs_{ut}$'), which can be emitted from the engine 10 and occluded in the NOx-occlusion-reduction-type catalyst 32, without considering a NOx reduction amount $rel_{NP\_ut}$ and a lean-time NOx release amount $rel_{lean\_ut}$, which will be described in detail later. The provisional NOx occlusion amount $abs_{ut}$ is calculated on the basis of a model equation including, as input values, the catalyst-inlet NOx amount $In_{NOx}$, the catalyst estimated temperature $Temp_{LNT}$, the NOx occlusion level $str_{lvl}$, an intake air amount detected by the MAF sensor 40, and the like, or a map.

A NOx reduction amount calculation unit 76 is configured to calculate a NOx reduction amount $rel_{NP\_ut}$, which is to be reduced by implementation of the NOx purge control. The NOx reduction amount $rel_{NP\_ut}$ is calculated on the basis of a model equation including, as input values, the catalyst estimated temperature $Temp_{LNT}$, the NOx occlusion level $str_{lvl}$, an intake air amount detected by the MAF sensor 40, an exhaust lambda value detected by the NOx/lambda sensor 45, and the like, or a map.

A lean-time NOx release amount calculation unit 77 is configured to calculate a lean-time NOx release amount $rel_{lean\_ut}$ that is to be separated and released from the NOx-occlusion-reduction-type catalyst 32 during a lean operation (for example, during an increase in exhaust temperature such as during filter regeneration) in which the NOx purge control is not implemented. The lean-time NOx release amount $rel_{lean\_ut}$ is calculated by multiplying a map value $rel_{map}$ of a release efficiency map, which is referred to on the basis of the catalyst estimated temperature $Temp_{LNT}$ and the NOx occlusion level $str_{lvl}$, by the NOx occlusion amount estimated value $str_{est}$ and a predetermined constant C, which is set in correspondence to NOx release speed ($rel_{lean\_ut}=rel_{map} \times str_{est} \times C$).

A NOx occlusion amount estimated value calculation unit 78 is configured to calculate a NOx occlusion amount estimated value $str_{est}$ occluded in the NOx-occlusion-reduction-type catalyst 32. The NOx occlusion amount estimated value $str_{est}$ is calculated on the basis of an equation (3) in which values per unit time obtained by subtracting the NOx reduction amount $rel_{ut}$ and the lean-time NOx release amount $rel_{lean\_ut}$ from the provisional NOx occlusion amount are summed.

$$str_{est} = \Sigma(abs_{ut} - rel_{NP\_ut} - rel_{lean\_ut}) \tag{3}$$

A catalyst-outlet NOx amount calculation unit 79 is configured to calculate a NOx amount (hereinafter, referred to as 'catalyst-outlet NOx amount Out$_{NOx}$') in the exhaust gas having passed through the NOx-occlusion-reduction-type catalyst 32. The catalyst-outlet NOx amount Out$_{NOx}$ is calculated on the basis of an equation (4) in which the lean-time NOx release amount rel$_{lean\_ut}$ is added to a value obtained by subtracting the NOx occlusion amount estimated value str$_{est}$ from the catalyst-inlet NOx amount In$_{NOx}$.

$$\text{NOx}\_{out}=\text{NOx}\_{in}-\text{str}\_{est}+\text{rel}\_{lean\_ut} \quad (4)$$

In this way, in the illustrative embodiment, the NOx occlusion amount estimated value str$_{est}$ and the catalyst-outlet NOx amount Out$_{NOx}$ are estimated and calculated, considering the lean-time NOx release amount rel$_{lean\_ut}$, which is to be separated and released from the NOx-occlusion-reduction-type catalyst 32 due to the increase in exhaust temperature during the lean operation, so that it is possible to securely improve the estimation accuracy.

[MAF Follow-Up Control]

The MAF follow-up control unit 80 is configured to execute MAF follow-up control of correcting a fuel injection timing and a fuel injection amount of each in-cylinder injector 11 in correspondence to MAF change (1) for a switching time period from a lean state of normal operation to a rich state by the NOx purge control and (2) for a switching time period from the rich state by the NOx purge control to the lean state of normal operation.

[Injection Amount Learning Correction]

Figure 6:
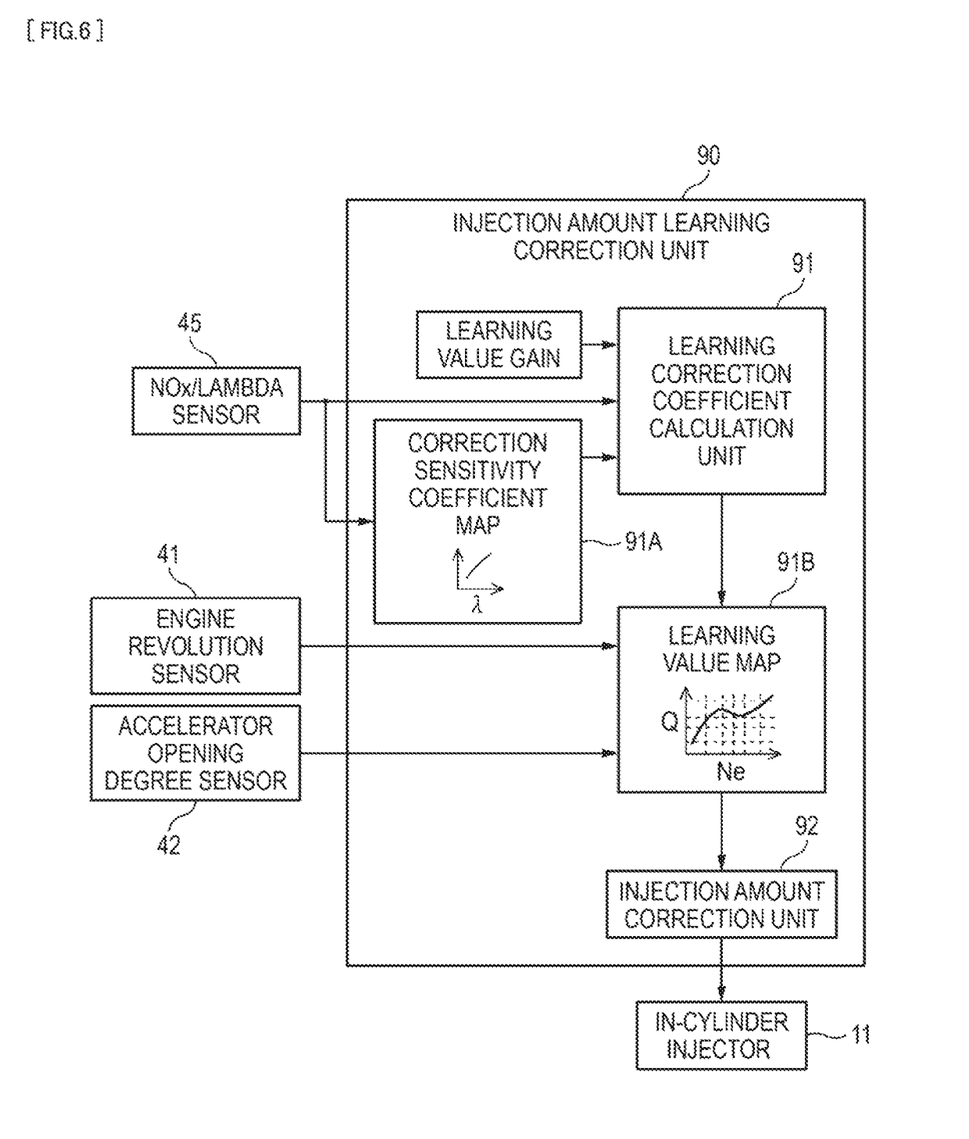
FIG. 6 is a block diagram depicting injection amount learning correction processing of an in-cylinder injector in accordance with the illustrative embodiment.

As shown in FIG. 6, an injection amount learning correction unit 90 includes a learning correction coefficient calculation unit 91 and an injection amount correction unit 92.

The learning correction coefficient calculation unit 91 is configured to calculate a learning correction coefficient $F_{Corr}$ of the fuel injection amount, based on an error $\Delta\lambda$ between an actual lambda value $\lambda_{Act}$, which is to be detected by the NOx/lambda sensor 45 during the lean operation of the engine 10, and an estimated lambda value $\lambda_{Est}$. When the exhaust is in the lean state, an HC concentration in the exhaust is very small, so that a change in exhaust lambda value due to an oxidation reaction of HC in the oxidation catalyst 31 is negligible small. For this reason, it is thought that the actual lambda value $\lambda_{Act}$ in the exhaust, which passes through the oxidation catalyst 31 and is detected by the downstream-side NOx/lambda sensor 45, coincides with the estimated lambda value $\lambda_{Est}$ in the exhaust emitted from the engine 10. That is, when the error $\Delta\lambda$ occurs between the actual lambda value $\lambda_{Act}$ and the estimated lambda value $\lambda_{Est}$, it can be assumed that the error is caused due to a difference between an instructed injection amount to each in-cylinder injector 11 and the actual injection amount. In the below, learning correction coefficient calculation processing, which is to be performed using the error $\Delta\lambda$ by the learning correction coefficient calculation unit 91, is described with reference to a flowchart of FIG. 7.

Figure 7:
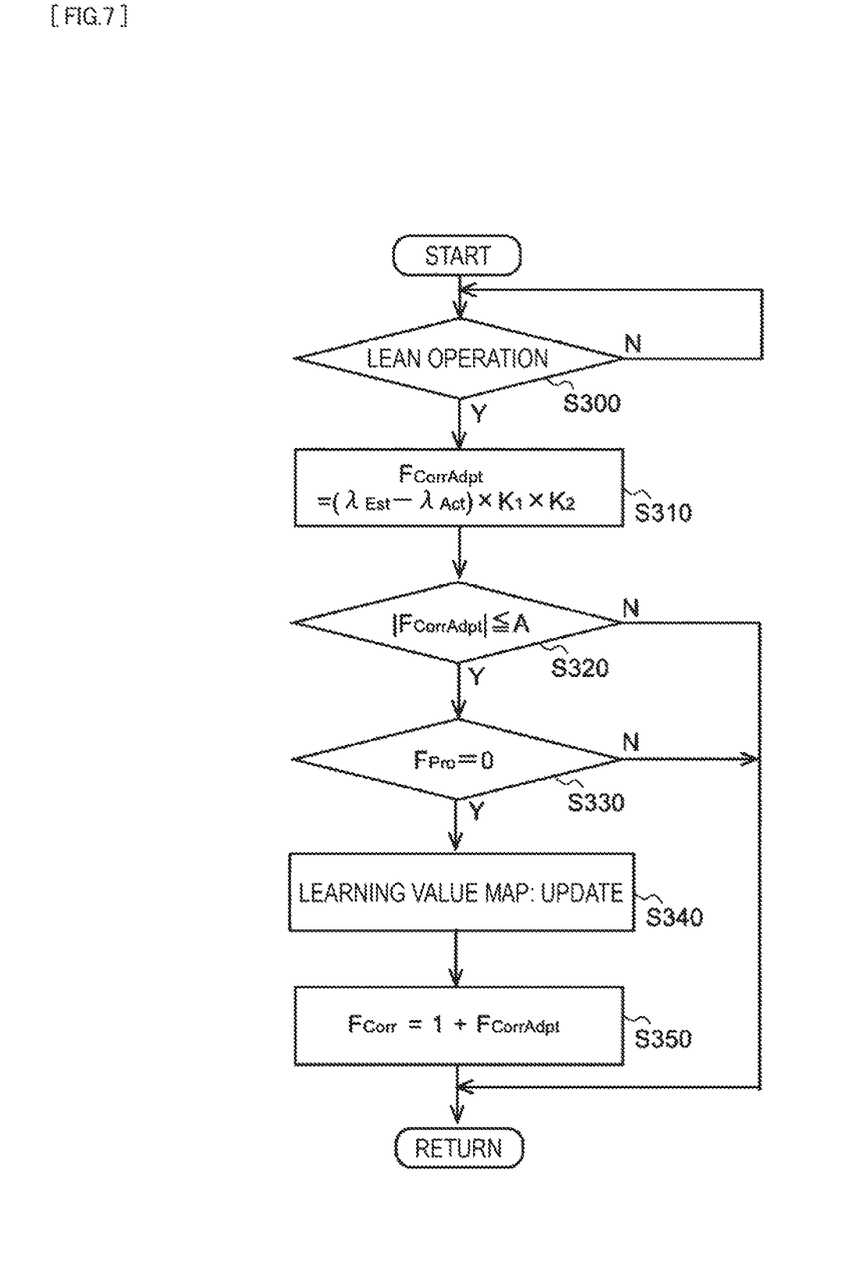
FIG. 7 is a flowchart depicting learning correction coefficient calculation processing in accordance with the illustrative embodiment.

In step S300, it is determined whether the engine 10 is in a lean operating state, based on the engine revolution Ne and the accelerator opening degree Q. When it is determined that the engine is in the lean operating state, the learning correction coefficient calculation unit proceeds to step S310 so as to start learning correction coefficient calculation.

In step S310, a learning value $F_{CorrAdpt}$ is calculated ($F_{CorrAdpt}=(\lambda_{Est}-\lambda_{Act})\times K_1\times K_2$) by multiplying the error $\Delta\lambda$, which is obtained by subtracting the actual lambda value $\lambda_{Act}$ detected at the NOx/lambda sensor 45 from the estimated lambda value $\lambda_{Est}$, by a learning value gain $K_1$ and a correction sensitivity coefficient $K_2$. The estimated lambda value $\lambda_{Est}$ is estimated and calculated from the operating state of the engine 10 corresponding to the engine revolution Ne and the accelerator opening degree Q. Also, the correction sensitivity coefficient $K_2$ is read from a correction sensitivity coefficient map 91A shows in FIG. 6, in response to the actual lambda value $\lambda_{Act}$ detected at the NOx/lambda sensor 45, which is an input signal.

In step S320, it is determined whether an absolute value $|F_{CorrAdpt}|$ of the learning value $F_{CorrAdpt}$ is within a range of a predetermined correction limit value A. When it is determined that the absolute value $|F_{CorrAdpt}|$ exceeds the correction limit value A, the control returns and this learning is stopped.

In step S330, it is determined whether a learning inhibition flag $F_{Pro}$ is off. As the learning inhibition flag $F_{Pro}$, for example, a transient operation of the engine 10, the NOx purge control ($F_{NP}=1$) and the like are exemplified. The reason is that when the corresponding conditions are satisfied, the error $\Delta\lambda$ increases due to a change in the actual lambda value $\lambda_{Act}$, so that the correct learning cannot be performed. Regarding the determination as to whether the engine 10 is in the transient operation, based on a temporal change amount of the actual lambda value $\lambda_{Act}$ detected at the NOx/lambda sensor 45, when the temporal change amount is greater than a predetermined threshold value, it may be determined that the engine is in the transient operation.

In step S340, a learning value map 91B (refer to FIG. 6), which is referred to on the basis of the engine revolution Ne and the accelerator opening degree Q, is updated to the learning value $F_{CorrAdpt}$ calculated in step S310. More specifically, in the learning value map 91B, a plurality of learning regions divided in correspondence to the engine revolution Ne and the accelerator opening degree Q is set. The learning regions are preferably set to be narrower as use frequencies thereof are higher and to be wider as use frequencies thereof are lower. Thereby, the learning accuracy is improved in the region of which use frequency is high and it is possible to effectively prevent the non-learning in the region of which use frequency is low.

In step S350, in response to the engine revolution Ne and the accelerator opening degree Q, which are input signals, "1" is added to the learning value read from the learning value map 91B, so that a learning correction coefficient $F_{Corr}$ is calculated ($F_{Corr}=1+F_{corrAdpt}$). The learning correction coefficient $F_{Corr}$ is input to the injection amount correction unit 92 shown in FIG. 6.

The injection amount correction unit 92 multiplies respective basic injection amounts of pilot injection $Q_{Pilot}$, pre-injection $Q_{Pre}$, main injection $Q_{Main}$, after-injection $Q_{After}$ and post injection $Q_{Post}$ by the learning correction coefficient $F_{Corr}$, thereby correcting the fuel injection amounts.

In this way, the fuel injection amount to each in-cylinder injector 11 is corrected by the learning value corresponding to the error $\Delta\lambda$ between the estimated lambda value $\lambda_{Est}$ and the actual lambda value $\lambda_{Act}$, so that it is possible to effectively exclude the non-uniformity such as aging degradation, characteristic change, individual difference and the like of each in-cylinder injector 11.

[MAF Correction Coefficient]

Figure 8:
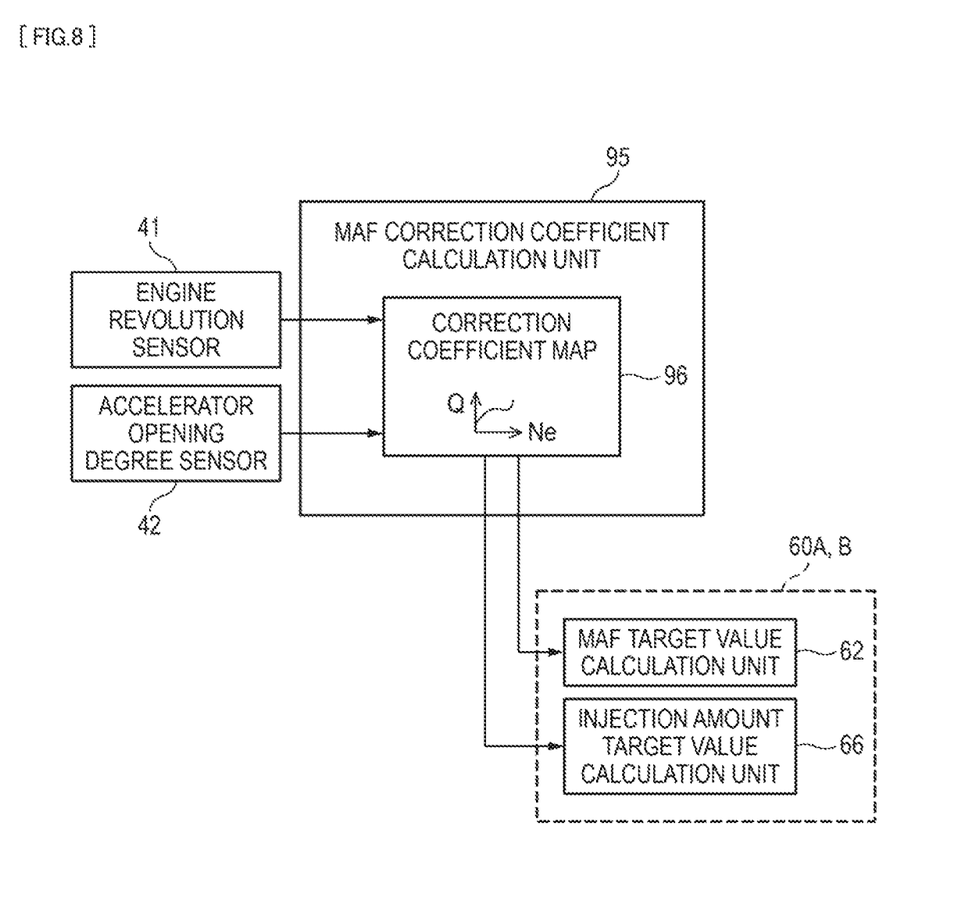
FIG. 8 is a block diagram depicting MAF correction coefficient setting processing in accordance with the illustrative embodiment.

The MAF correction coefficient calculation unit 95 is configured to calculate an MAF correction coefficient Maf$_{corr}$, which is to be used for the setting of the MAF target value MAF$_{NPL\_Trgt}$ and the target injection amount $Q_{NPR\_Trgt}$ upon the NOx purge control.

In the illustrative embodiment, the fuel injection amount of each in-cylinder injector 11 is corrected on the basis of the error Δλ between the actual lambda value $\lambda_{Act}$ detected at the NOx/lambda sensor 45 and the estimated lambda value $\lambda_{Est}$. However, since the lambda is a ratio of air and fuel, it cannot be said that the error Δλ is necessarily caused due to only the difference between the instructed injection amount to each in-cylinder injector 11 and the actual injection amount. That is, the error Δλ of the lambda may be influenced not only by each in-cylinder injector 11 but also an error of the MAF sensor 40.

FIG. 8 is a block diagram depicting setting processing of the MAF correction coefficient $Maf_{corr}$, which is to be performed by the MAF correction coefficient calculation unit 95. A correction coefficient setting map 96 is a map that is to be referred to on the basis of the engine revolution Ne and the accelerator opening degree Q, and an MAF correction coefficient $Maf_{corr}$ indicative of a sensor characteristic of the MAF sensor 40 corresponding to the engine revolution Ne and the accelerator opening degree Q is set in advance by a test and the like.

The MAF correction coefficient calculation unit 95 reads the MAF correction coefficient $Maf_{corr}$ from the correction coefficient setting map 96, in response to the engine revolution Ne and the accelerator opening degree Q, which are input signals, and transmits the MAF correction coefficient $Maf_{corr}$ to the MAF target value calculation unit 62 and the injection amount target value calculation unit 66. Thereby, it is possible to effectively reflect the sensor characteristics of the MAF sensor 40 when setting the MAF target value $MAF_{NPL\_Trgt}$ and the target injection amount $Q_{NPR\_Trgt}$ upon the NOx purge control.

[Others]

In the meantime, the present invention is not limited to the above illustrative embodiment and can be implemented with being appropriately modified without departing from the gist of the present invention.

The subject application is based on a Japanese Patent Application No. 2015-057084 filed on Mar. 20, 2015, the entire contents of which are incorporated herein by reference.

INDUSTRIAL APPLICABILITY

The present invention can effectively improve the estimation accuracy of the NOx occlusion amount and is useful for the NOx occlusion amount estimating device, and the like.

REFERENCE SIGNS LIST

10: engine
11: in-cylinder injector
12: intake passage
13: exhaust passage
16: intake throttle valve
24: EGR valve
31: oxidation catalyst
32: NOx-occlusion-reduction-type catalyst
33: filter
34: exhaust injector
40: MAF sensor
45: NOx/lambda sensor
50: ECU

The invention claimed is:

1. A NOx occlusion amount estimating device of a NOx-occlusion-reduction-type catalyst provided in an exhaust passage of an engine and configured to purify NOx in exhaust, the device comprising a controller configured to:
    acquire a catalyst temperature of the NOx-occlusion-reduction-type catalyst;
    calculate, as a provisional NOx occlusion amount, a NOx amount, which is to be emitted from the engine and occluded in the NOx-occlusion-reduction-type catalyst, on the basis of a catalyst-inlet NOx amount estimated from an operating state of the engine and the acquired catalyst temperature;
    calculate a NOx occlusion capacity of the catalyst based on the catalyst-inlet NOx amount and the catalyst temperature;
    calculate a NOx occlusion level based on the calculated NOx occlusion capacity;
    calculate a lean-time NOx release amount, which is to be separated and released from the NOx-occlusion-reduction-type catalyst during a lean operation of the engine, on the basis of the acquired catalyst temperature during the lean operation, the calculated NOx occlusion level, and a NOx release speed; and
    calculate an actual NOx occlusion amount occluded in the NOx-occlusion-reduction-type catalyst by subtracting the lean-time NOx release amount from the provisional NOx occlusion amount.

2. The NOx occlusion amount estimating device according to claim 1,
    wherein the NOx-occlusion-reduction-type catalyst is a NOx-occlusion-reduction-type catalyst configured to occlude NOx in the exhaust in an exhaust lean state and to reduce and purify the occluded NOx in an exhaust rich state,
    wherein the controller is further configured to:
        calculate a NOx reduction amount, which is to be reduced and purified from the NOx-occlusion-reduction-type catalyst in the exhaust rich state, on the basis of the acquired catalyst temperature, and
    wherein in the calculating the actual NOx occlusion amount, the controller is configured to calculate the actual NOx occlusion amount by subtracting the lean-time NOx release amount and the NOx reduction amount from the provisional NOx occlusion amount.

3. The NOx occlusion amount estimating device according to claim 1, wherein the controller is further configured to:
    calculate a NOx occlusion capacity of the catalyst on the basis of the catalyst-inlet NOx amount and the catalyst temperature; and
    calculate a NOx release efficiency of the catalyst on the basis of a current NOx occlusion level, which is to be obtained from the NOx occlusion capacity and the actual NOx occlusion amount, and the catalyst temperature, and
    wherein in the calculating the NOx release amount, the controller is configured to calculate the lean-time NOx release amount by multiplying the NOx release efficiency by the actual NOx occlusion amount.

4. A NOx occlusion amount estimating method of a NOx-occlusion-reduction-type catalyst provided in an exhaust passage of an engine and configured to purify NOx in exhaust, the method comprising:
    acquiring a catalyst temperature of the NOx-occlusion-reduction-type catalyst;
    calculating, as a provisional NOx occlusion amount, a NOx amount, which is to be emitted from the engine and occluded in the NOx-occlusion-reduction-type catalyst, on the basis of a catalyst-inlet NOx amount estimated from an operating state of the engine and a catalyst temperature acquired by the catalyst temperature acquisition processing;

calculating a NOx occlusion capacity of the catalyst based on the catalyst-inlet NOx amount and the catalyst temperature;

calculating a NOx occlusion level based on the calculated NOx occlusion capacity;

calculating a lean-time NOx release amount, which is to be separated and released from the NOx-occlusion-reduction-type catalyst during a lean operation of the engine, on the basis of the catalyst temperature acquired by the catalyst temperature acquisition processing during the lean operation, the calculated NOx occlusion level, and a NOx release seed; and calculating an actual NOx occlusion amount occluded in the NOx-occlusion-reduction-type catalyst by subtracting the lean-time NOx release amount from the provisional NOx occlusion amount.

5. A NOx occlusion amount estimating device of a NOx-occlusion-reduction-type catalyst provided in an exhaust passage of an engine and configured to purify NOx in exhaust, the device comprising:

catalyst temperature acquisition means for acquiring a catalyst temperature of the NOx-occlusion-reduction-type catalyst;

provisional NOx occlusion amount calculation means for calculating, as a provisional NOx occlusion amount, a NOx amount, which is to be emitted from the engine and occluded in the NOx-occlusion-reduction-type catalyst, on the basis of a catalyst-inlet NOx amount estimated from an operating state of the engine and the catalyst temperature acquired by the catalyst temperature acquisition means;

NOx occlusion capacity calculation means for calculating a NOx occlusion capacity of the catalyst based on the catalyst-inlet NOx amount and the catalyst temperature;

NOx occlusion level calculation means for calculating a NOx occlusion level based on the calculated NOx occlusion capacity;

NOx release amount calculation means for calculating a lean-time NOx release amount, which is to be separated and released from the NOx-occlusion-reduction-type catalyst during a lean operation of the engine, on the basis of the catalyst temperature acquired by the catalyst temperature acquisition means during the lean operation, the calculated NOx occlusion level, and a NOx release speed; and actual NOx occlusion amount calculation means for calculating an actual NOx occlusion amount occluded in the NOx-occlusion-reduction-type catalyst by subtracting the lean-time NOx release amount from the provisional NOx occlusion amount.

* * * * *